United States Patent
Wang et al.

(10) Patent No.: US 11,087,906 B2
(45) Date of Patent: Aug. 10, 2021

(54) AMPHOTERIC MAGNETIC MATERIAL AND MANUFACTURING METHOD THEREOF

(71) Applicant: GUANGZHOU NEWLIFE NEW MATERIAL CO., LTD, Guangzhou (CN)

(72) Inventors: Xiaoming Wang, Guangzhou (CN);
Huayi Zhao, Guangzhou (CN);
Longzhang Wu, Guangzhou (CN);
Chunsheng Guo, Guangzhou (CN);
Zhiying Wang, Guangzhou (CN)

(73) Assignee: GUANGZHOU NEWLIFE NEW MATERIAL CO., LTD, Guangzhou (CN)

( * ) Notice: Subject to any disclaimer, the term of this patent is extended or adjusted under 35 U.S.C. 154(b) by 291 days.

(21) Appl. No.: 16/155,225

(22) Filed: Oct. 9, 2018

(65) Prior Publication Data

US 2019/0237227 A1    Aug. 1, 2019

(30) Foreign Application Priority Data

Jan. 30, 2018 (CN) .......................... 201810091935.3

(51) Int. Cl.
| | | |
|---|---|---|
| *H01F 1/03* | (2006.01) | |
| *H01F 1/055* | (2006.01) | |
| *B29C 67/24* | (2006.01) | |
| *H01F 1/147* | (2006.01) | |
| *H01F 7/02* | (2006.01) | |
| *H01F 41/02* | (2006.01) | |
| *B29K 505/00* | (2006.01) | |

(52) U.S. Cl.
CPC ............ *H01F 1/0306* (2013.01); *B29C 67/24* (2013.01); *H01F 1/0555* (2013.01); *H01F 1/147* (2013.01); *H01F 7/0215* (2013.01); *H01F 41/0266* (2013.01); *B29K 2505/00* (2013.01); *B29K 2995/0008* (2013.01)

(58) Field of Classification Search
CPC ............. B29C 67/24; B29C 2995/0008; H01F 1/0555; H01F 1/14741
See application file for complete search history.

(56) References Cited

U.S. PATENT DOCUMENTS

| | | | | |
|---|---|---|---|---|
| 6,017,667 A | * | 1/2000 | Hakata | ............. G03G 9/107 |
| | | | | 252/62.54 |
| 7,393,463 B2 | * | 7/2008 | Ulicny | ............. H01F 1/447 |
| | | | | 252/62.52 |
| 8,263,224 B2 | * | 9/2012 | Tokiwa | ............. C09J 7/22 |
| | | | | 428/407 |
| 8,747,996 B2 | | 6/2014 | Deetz | |
| 2010/0314572 A1 | * | 12/2010 | Bose | ............. H01F 1/447 |
| | | | | 252/62.54 |

FOREIGN PATENT DOCUMENTS

| | | |
|---|---|---|
| CN | 201037294 Y | 3/2008 |
| CN | 201400829 Y | 2/2010 |
| CN | 103730227 A | 4/2014 |
| CN | 104332263 A | 2/2015 |
| CN | 104529424 A | 4/2015 |
| CN | 104945754 A | 9/2015 |

* cited by examiner

*Primary Examiner* — C Melissa Koslow
(74) *Attorney, Agent, or Firm* — Vivacqua Crane

(57) ABSTRACT

A magnetic material having dual properties and a manufacturing method thereof are disclosed. The magnetic material having dual properties consists of: 5% to 88% of a permanent magnetic material, 5% to 88% of a soft magnetic material, 6% to 16% of a binder, and 1% to 10% of an auxiliary agent. The magnetic material having dual properties manufactured by mixing two phases without microscopic intergranular exchange coupling interaction has unexpected effects: the range of a magnetically attracted object is expanded to include a magnet having dual properties; the range of a magnetically attractive object is expanded to include a magnet having dual properties; the minimum value of the magnetic attraction force is increased, the magnetic attraction force is more uniform, and it is smoother to move and rotate an object. The effect obtained by two layers of the soft magnet and the permanent magnet can be realized by a single layer structure of the magnet having dual properties.

6 Claims, 3 Drawing Sheets

AMPHOTERIC MAGNETIC MATERIAL AND MANUFACTURING METHOD THEREOF

CROSS-REFERENCE TO RELATED APPLICATION

This application claims the priority of Chinese patent application No. 201810091935.3 entitled "MAGNETIC MATERIAL HAVING DUAL PROPERTIES AND MANUFACTURING METHOD THEREOF" filed on Jan. 30, 2018, which is hereby incorporated by reference in its entirety.

FIELD

The present invention relates to a magnetic material having dual properties material and a manufacturing method thereof.

BACKGROUND

The interactive magnetic force between objects is used to realize the adsorption, suspension and display of objects, which has a variety of applications in our industrial and civil products and which changes various aspects of our life, for example, in industrial motors and civil magnetic advertising materials. When using magnetic attraction force, we usually aim to obtain maximum magnetic properties with the smallest volume of material, which macroscopically manifested as the pursuit of obtaining the strongest attraction force which is firm and not weakening over time.

In the prior art, interactive attraction is shown between a permanent magnetic object and a soft magnetic surface, and the permanent magnetic object can move and change directions deftly and randomly. CN201037294Y discloses an iron wallpaper. This patent discloses that magnetic products with any polarity may be attracted to the wallpaper surface randomly, and it can be used conveniently without strictly identifying the polarity of the magnetic products, so that the structure is more reasonable. Moreover, there is no case that use is affected because magnetism decreases and the attraction force is reduced due to long-time use. The iron wallpaper can be used normally as long as the magnetic products are ensured to have sufficient magnetic force, which is very advantageous for production and application. By using this technology, any magnetic objects can be attracted to the iron wallpaper randomly, and the position and angle thereof can be changed randomly as required, so that the iron wallpaper is very convenient for use and has a wide range of application. However, there is a problem that not all objects that need magnetic attraction are in a match of a permanent magnet with a soft magnet, and there is no attraction between a soft magnet and another soft magnet, thus the iron wallpaper cannot attract any soft magnetic exhibits nor can it be attracted to a soft magnetic support surface.

In the prior art, a soft magnetic material is generally used for magnetic conduction. In advertising consumables, a soft magnetic material is generally made into magnetic receptive films. A high-molecular polymer as a separate layer of soft magnetic filler is used in combination with other magnetic layers or objects. This effect has been disclosed in various patent documents. U.S. Pat. No. 8,747,996 discloses a magnetic graphic wall system, wherein the magnetic graphic wall system mainly uses ferroferric oxide, a soft magnetic material, as a magnetic receptive layer, which is used with a permanent magnetic layer magnetized by multiple polarity lines in the bottom layer for wall exhibition; and the match magnetized magnetic objects of the second layer and the third layer can further be attracted thereto. With this technology, multi-layer exhibition by magnetic attraction is realized, and the multiple polarity line magnetization in the bottom layer determines the position of the subsequent second and third layers, the magnetism will not be weakened over time, the position is fixed and the exhibition is neat. However, to realize the interactive attraction of magnetic objects the magnetization must correspond to the magnetic layer at the bottom layer, and at least two layers are required to be matched to realize the attraction described in the patent.

In the prior art, there are patents of using soft magnetic materials to concentrate the effect of the magnetic induction lines so as to improve the utilization rate of magnetic properties. CN104945754A discloses a rubber-extruded magnetic strip which increases the attraction force. The rubber-extruded magnetic strip functions to aggregate and strengthen the magnetic induction lines, and also strengthens the original distribution of the magnetic induction lines, so that the magnetic strip is fixed under force and cannot move freely. The attraction effect is also realized by two layers.

In the prior art, a receptive soft magnetic layer is used as an independent layer to play its role of magnetic conduction and concentration of the magnetic conduction lines, and a permanent magnetic layer also exerts its magnetic properties as an independent layer. The magnetic properties are closely related to the content of permanent magnetic powder. Those skilled in the art would always pursue the highest possible content of magnetic powder to achieve the maximum utilization of magnetic properties. Any addition that does not achieve the microscopic intergranular exchange coupling interaction will lead to a larger magnetic domain spacing within the magnet, weakening the overall maximum magnetic energy product (BH)max of the magnet and reducing the macroscopically external magnetic properties of the magnet. Any professionals in the magnetic industry will not try to utilize a mixture of a soft magnetic phase and a permanent magnetic phase without microscopic intergranular exchange coupling interaction. This is due to an indisputable fact that the mixture of a permanent magnet and a soft magnet without microscopic intergranular exchange coupling interaction will simply reduce the magnetic properties of the mixed body, and the same corresponding effect of use can be realized only by increasing the size of the magnet, which goes against the pursuit of smaller size with higher properties. Whenever the permanent magnet is mixed with the soft magnet, those skilled in the art would pursue the improvement in magnetic properties such as the remanence, the coercive force and the maximum magnetic energy product of the mixed body. In related patents, for the pursuit of the magnetic properties of the mixed magnet, the microscopic exchange coupling is realized by way of sintering and the like. For example, among related patents, CN104529424A discloses a composite permanent magnetic ferrite having functions of realizing two-phase exchange coupling and keeping a high coercive force; CN104332262A discloses a nanometer double-phase composite permanent magnetic material with a high magnetic energy product and a preparation method thereof; and CN103730227A discloses a nanometer double-phase isotropic composite permanent magnet and a preparation method thereof.

Among existing patents, there are patents involving the mixture of a permanent magnet and a soft magnet. For example, CN201400829Y discloses a magnetic paper product which may be directly printed on, including a printing layer which can be directly printed, wherein a magnetic coating layer is provided on a side of the printing layer, and the magnetic coating layer is tightly bonded to the surface of the printing layer. This patent has the following beneficial technical effects: (1) the magnetic paper product has a small thickness, and the minimum thickness of the magnetic paper product with a single-layer paper structure can reach 0.1 mm, while it is very difficult to achieve such an effect with the existing magnetic rubber technology, thus the magnetic paper product has a wider application range than the existing products and can be applied not only in the office field but also in the industrial field; (2) the magnetic paper product has good flexibility which is basically equal to that of the paper used; and when it is used, more space is saved, and the application is more convenient; (3) since the production of the magnetic coating is easier than that of the magnetic rubber, the magnetic paper product is simpler in production process and lower in production cost; (4) printing, writing and appearance beautifying can be directly performed on the printing layer on one side or two sides of the magnetic paper product, thus it is more convenient to use; and (5) since the product is relatively light in weight, a larger magnetic force can be obtained, and the magnetic paper product can be attractively attached to a surface of an iron or magnetic tool more firmly so as to realize the purpose of beatification and decoration. It can be known that, the patent also simply aims at pursuing for a smaller thickness, a smaller size, a larger attraction force and firm attachment, and does not involve any detailed technical effect of the magnet having dual properties, because the technical effect brought by the mixture of a permanent magnet and a soft magnet according to this patent will certainly comprise the decrease of the magnetic properties of the magnet, and the purpose of obtaining stronger magnetic properties with a smaller size cannot be realized, which goes against the objective of this patent.

SUMMARY

An objective of the present invention is to provide a magnetic material having dual properties and a manufacturing method thereof.

The present invention employs the following technical solutions.

In an embodiment of the invention, a magnetic material having dual properties is provided, which consists of the following raw materials by mass percentage: 5% to 88% of a permanent magnetic material, 5% to 88% of a soft magnetic material, 6% to 16% of a binder, and 1% to 10% of an auxiliary agent.

In an embodiment of the invention, in the magnetic material having dual properties, both the permanent magnetic material and the soft magnetic material are sheet-shaped.

In an embodiment of the invention, the permanent magnetic material is selected from at least one of Al—Ni—Co permanent magnetic alloy, Fe—Co permanent magnetic alloy, permanent magnetic ferrite and rare-earth permanent magnetic material.

In an embodiment of the invention, the particle size of the soft magnetic material is not greater than 100 meshes.

In an embodiment of the invention, the soft magnet material is selected from at least one of pure iron, low-carbon steel, Fe—Si alloy, Fe—Al alloy, Fe—Si—Al alloy, Ni—Fe alloy, Fe—Co alloy, soft magnetic ferrite, amorphous soft magnetic alloy, microcrystalline soft magnetic alloy, nanocrystalline soft magnetic alloy, and impurity containing materials thereof.

In an embodiment of the invention, in the magnetic material having dual properties, the binder is selected from at least one of thermoplastics, thermosetting plastics, rubber, resin for coating and emulsion for coating.

In a further embodiment, the binder is selected from at least one of CPE (chlorinated polyethylene), NBR (nitrile butadiene rubber), HNBR (hydrogenated nitrile-butadiene rubber), PVC (polyvinyl chloride), PE (poly ethene), PP (poly propylene), POE (polyolefin elastomer), EVA (ethylene-vinyl acetate copolymer), EAA (ethyl acetoacetate), EEA (ethylene ethylacrylate copolymer), TPE (thermoplastic elastomer), TPU (thermoplastic polyurethanes), SEBS (styrene-ethylene-butylene-styrene block copolymer), SBS (styrene-butylene-styrene block copolymer), IR (polyisoprene rubber), IIR (isobutylene isoprene rubber), CR (chloroprene rubber), EPDM (ethylene propylene diene monomer), NR (natural rubber), EVA (ethylene-vinyl acetate copolymer) emulsion, VAE (vinyl-acetate ethylene copolymer) emulsion, styrene-acrylic emulsion, silicone-acrylic emulsion, pure acrylic emulsion, vinyl acetate/acrylic emulsion and polyurethane emulsion.

In an embodiment of the invention, in the magnetic material having dual properties, the auxiliary agent is selected from at least one of an antioxidant, a stabilizer, a lubricant, a coupling agent, an ultraviolet absorber, a dispersing agent, an antifoaming agent and a thickening agent.

The present invention also provides a method for manufacturing the magnetic material having dual properties, wherein a permanent magnetic material, a soft magnetic material, a binder and an auxiliary agent are mixed uniformly, molded, orientated and magnetized to obtain the magnetic material having dual properties, wherein molding and orienting occur simultaneously.

In an embodiment of the invention, the molding method is selected from any one of calendering, tape casting, injection molding, and extrusion molding.

The present invention has the following beneficial effects.

In the technical solution disclosed by the present invention, a magnet having dual properties is manufactured by mixing two phases without microscopic intergranular exchange coupling interaction. Although the maximum magnetic energy product of the magnetic is sacrificed to some extent, unexpected magnetic expansion effects are achieved: the range of the magnetically attracted object is expanded to include a magnet having dual properties in addition to a permanent magnet and a soft magnet; the range of the magnetic attractive object is expanded to include a magnet having dual properties in addition to a permanent magnet; and the minimum value of the magnetic attraction force at random position and angle is increased, overcoming the problem that the adsorption is not firm at the minimum value of the magnetic attraction force with the permanent magnet in its self-attraction and thus the problem with easy falling-off. Compared with the self-attraction between the permanent magnets, the fluctuation of the magnetic attraction force on the magnet having dual properties surface is smaller, the magnetic attraction force is more uniform, and it is smoother to move and rotate an object. The effect achieved by the double-layer matching of a soft magnet and a permanent magnet can be realized by a single-layer structure of a magnet having dual properties. The appearance of the magnet having dual properties opens up a new field for magnetic products.

DRAWINGS

DETAILED DESCRIPTION

Figure 1:
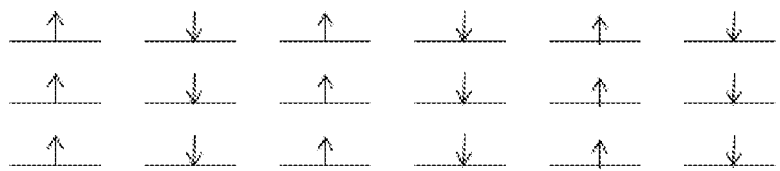
FIG. 1 is a schematic structural diagram of a magnetic object having dual properties.

In an embodiment of the invention, a magnetic material having dual properties is provided, which consists of the following raw materials by mass percentage: 5% to 88% of a permanent magnetic material, 5% to 88% of a soft magnetic material, 6% to 16% of a binder, and 1% to 10% of an auxiliary agent.

Preferably, the magnetic material having dual properties consists of the following raw materials by mass percentage: 70% to 75% of a permanent magnetic material, 15% to 20% of a soft magnetic material, 7% to 10% of a binder, and 1% to 5% of an auxiliary agent. More preferably, the magnetic material having dual properties consists of the following raw materials by mass percentage: 71% to 72% of a permanent magnetic material, 18% to 19% of a soft magnetic material, 8% to 9% of a binder, and 1% to 2% of an auxiliary agent.

Preferably, in the magnetic material having dual properties, both the permanent magnetic material and the soft magnetic material are sheet-shaped.

Preferably, the permanent magnetic material is selected from at least one of an Al—Ni—Co permanent magnetic alloy, a Fe—Co permanent magnetic alloy, a permanent magnetic ferrite and a rare-earth permanent magnetic material. More preferably, the permanent magnetic material is anisotropic ferrite magnetic powder.

Preferably, the particle size of the soft magnetic material is not greater than 100 meshes. The particle size being not greater than 100 meshes should be interpreted as follows: the particle size of the soft magnetic material is less than or equal to the particle size of the soft magnetic material in 100 meshes. For example, the particle size of the soft magnetic material in 300 meshes is less than the particle size of the soft magnetic material in 100 meshes.

Preferably, the soft magnet material is selected from at least one of a pure iron, a low-carbon steel, a Fe—Si alloy, a Fe—Al alloy, a Fe—Si—Al alloy, a Ni—Fe alloy, a Fe—Co alloy, a soft magnetic ferrite, an amorphous soft magnetic alloy, a microcrystalline soft magnetic alloy, a nanocrystalline soft magnetic alloy, and an impurities containing material thereof. More preferably, the soft magnetic material is selected from at least one of an iron ore concentrate powder and a Fe—Si—Al powder.

Preferably, in the magnetic material having dual properties, the binder is selected from at least one of thermoplastics, thermosetting plastics, rubber, resin for coating and emulsion for coating. More preferably, the binder is selected from at least one of CPE (chlorinated polyethylene), NBR (nitrile butadiene rubber), HNBR (hydrogenated nitrile-butadiene rubber), PVC (polyvinyl chloride), PE (poly ethene), PP (poly propylene), POE (polyolefin elastomer), EVA (ethylene-vinyl acetate copolymer), EAA (ethyl acetoacetate), EEA (ethylene ethylacrylate copolymer), TPE (thermoplastic elastomer), TPU (thermoplastic polyurethanes), SEBS (styrene-ethylene-butylene-styrene block copolymer), SBS (styrene-butylene-styrene block copolymer), IR (polyisoprene rubber), IIR (isobutylene isoprene rubber), CR (chloroprene rubber), EPDM (ethylene propylene diene monomer), NR (natural rubber), EVA (ethylene-vinyl acetate copolymer) emulsion, VAE (vinyl-acetate ethylene copolymer) emulsion, styrene-acrylic emulsion, silicone-acrylic emulsion, pure acrylic emulsion, vinyl acetate/acrylic emulsion and polyurethane emulsion. Most preferably, the binder is CPE.

Preferably, in the magnetic material having dual properties, the auxiliary agent is selected from at least one of an antioxidant, a stabilizer, a lubricant, a coupling agent, an ultraviolet absorber, a dispersing agent, an antifoaming agent and a thickening agent.

Preferably, the antioxidant is selected from at least one of a hindered phenol antioxidant, a phosphite antioxidant, a hindered amine antioxidant, a thioester antioxidant and an inorganic phosphate antioxidant.

Preferably, the stabilizer is selected from at least one of a lead salt stabilizer, a metallic soap stabilizer, an organic tin stabilizer, an organic antimony stabilizer, an organic rare-earth stabilizer, a calcium-zinc stabilizer and an epoxidized soybean oil.

Preferably, the lubricant is selected from at least one of silicone oil, silicone powder, white mineral oil, vegetable oil, fatty acid amide, stearic acid, stearate, montanate, paraffin, polyethylene wax, ethylene bisstearamide and pentaerythritol distearate.

Preferably, the coupling agent is selected from at least one of a silane coupling agent, a titanate coupling agent, an aluminate coupling agent, a zirconate coupling agent and a rare-earth coupling agent.

Preferably, the ultraviolet absorber is selected from at least one of benzophenone, benzotriazole, salicylate, triazine, substituted acrylonitrile and a hindered amine light stabilizer.

Preferably, the dispersing agent is selected from at least one of sodium oleate, carboxylate, sulphate, sulfonate, octadecenylamine acetate, alkyl quaternary ammonium salt, aminopropylamine dioleate, modified polyaminoamide phosphate, fatty acid-ethylene oxide adduct, polyethylene glycol type polyol, polyethylenimine derivative, phosphate high-molecular polymer and oily amino oleate.

Preferably, the antifoaming agent is selected from at least one of an organic silicon antifoaming agent, a polyether antifoaming agent, a polyether-modified organic silicon antifoaming agent, a mineral oil and modifiers thereof, and natural oil.

Preferably, the thickening agent is selected from at least one of a natural thickening agent, a cellulose thickening agent, an inorganic thickening agent and a synthetic polymer thickening agent.

In another embodiment of the invention, a method for manufacturing the magnetic material having dual properties is provided, wherein a permanent magnetic material, a soft magnetic material, a binder and an auxiliary agent are mixed uniformly, molded, orientated and then magnetized to obtain the magnetic material having dual properties, wherein molding and orienting occur simultaneously.

Preferably, the molding method is selected from any one of calendering, tape casting, injection molding, and extrusion molding.

Figure 2:
FIG. 2 is a schematic structural diagram of a soft magnetic object.
Figure 3:
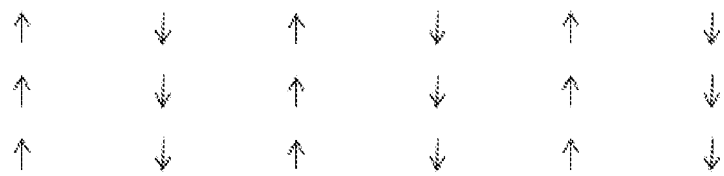
FIG. 3 is a schematic structural diagram of a permanent magnetic object.
Figure 4:
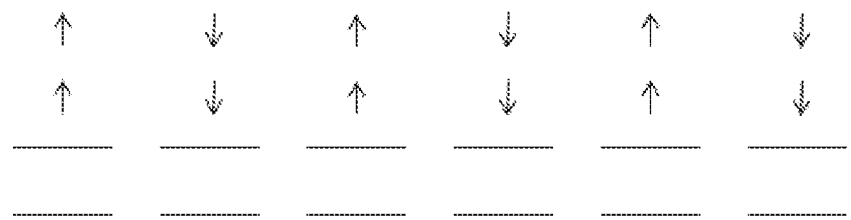
FIG. 4 is a schematic diagram of a magnetic object of a double-layer structure.
Figure 5:
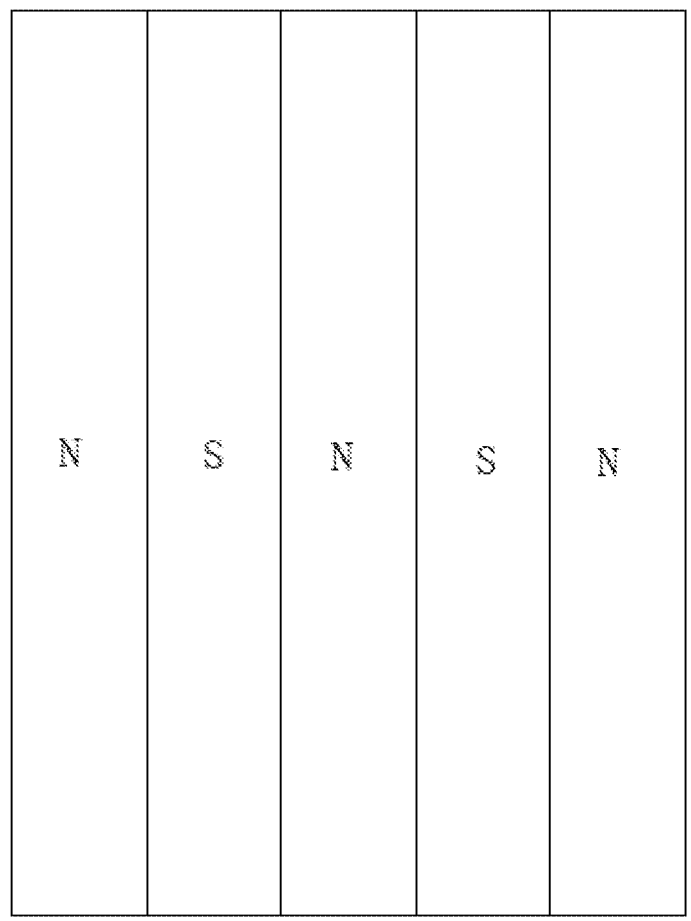
FIG. 5 is a schematic effect diagram of planar multipolar linear parallel magnetization.

The magnetic materials of different structures will be described below with reference to schematic diagrams. FIG. 1 is a schematic structural diagram of a magnetic object having dual properties, wherein an arrow represents a calendered and orientated permanent magnetic domain unit, a straight line represents a sheet-shaped soft magnetic phase, and the permanent magnet and the soft magnet fail to realize microscopic exchange coupling. FIG. 2 is a schematic structural diagram of a soft magnetic object, wherein a straight line represents a sheet-shaped soft magnetic phase. FIG. 3 is a schematic structural diagram of a permanent magnetic object, wherein an arrow represents an orientated magnetic domain unit. FIG. 4 is a schematic diagram of a magnetic object of a double-layer structure, wherein the bottom layer is a soft magnetic layer with a straight line representing a sheet-shaped soft magnetic phase, and the surface layer is a permanent magnetic layer with an arrow representing an oriented permanent magnetic domain unit.

The present invention will be further described below in detail by way of specific examples and comparison examples with reference to FIGS. 1-6. The raw materials used in the examples and comparison examples are conventionally commercially available.

Example 1

Referring to FIG. 1, a magnetic object having dual properties is provided, including a high-molecular polymer using a magnetic material as filler. The magnetic object having dual properties consists of components shown in Table 1.

Manufacturing steps are as follows:

internal mixing: the materials are prepared in proportions according to the formulation and then milled by an internal mixer, and the clinker is discharged after the milling temperature reached 120° C. to 150° C.;

open milling: the mixed material is milled again by an open mill;

refining and crushing: the open-milled rubber sheets are refined by the internal mixer to obtain small pellets and then crushed by a crusher;

calendering: the crushed granules are directly calendered by a calendar and processed into samples respectively having a thickness of 0.3 mm, 0.5 mm, 0.6 mm, 0.8 mm and 1.0 mm;

magnetizing: each sample is magnetized in a single-sided multipolar linear manner in a direction parallel to the calendering direction, the magnetic distance being 1.0 mm, 1.5 mm, 2.0 mm, respectively. The magnetic pole distribution of the magnetic rubber sheets after magnetized in a parallel multipolar linear manner is shown by the effect diagram of planar multipolar linear parallel magnetization in FIG. 5; and testing: the attraction force, magnetic permeability and magnetic properties of the samples according to this example in mutual attraction with the soft magnet and in self-attraction are tested.

Figure 6:
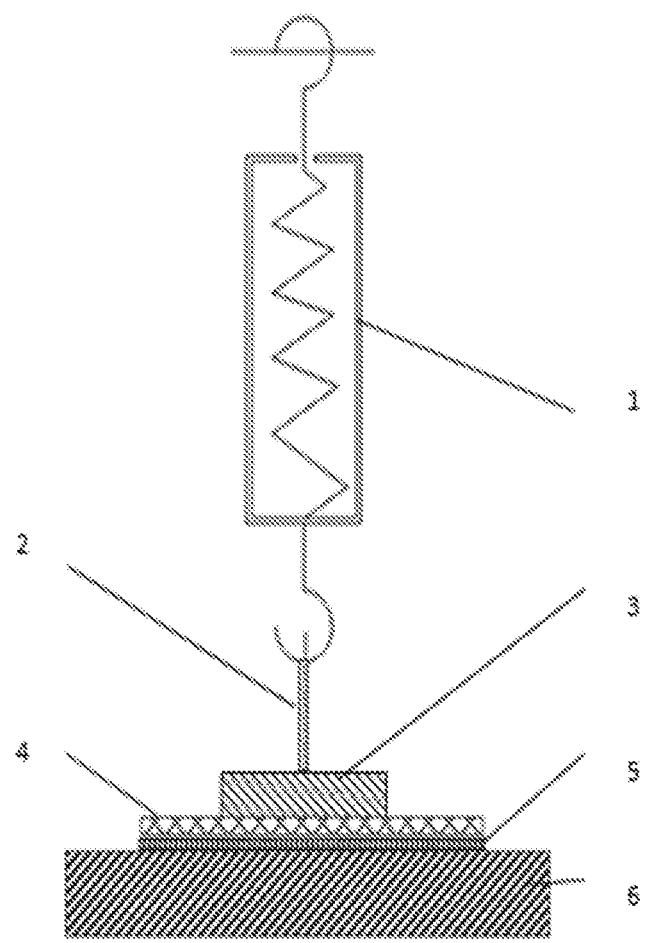
FIG. 6 is a schematic diagram of an attraction force test.

FIG. 6 is a schematic diagram of an attraction force test, wherein 1 represents a spring tension meter; 2 represents a pull rod for an iron plate; 3 represents a circular iron plate (soft magnet) having a thickness of 5 mm and an area of 10 cm2 or another mutually attracted sample to be tested (magnet having dual properties or permanent magnet); 4 represents a sample to be tested having an area greater than that of the circular iron plate; 5 represents a double-sided adhesive tape for fixing the sample to be tested; and, 6 represents a flat aluminum fixed base. The method for the attraction force test is described below with reference to FIG. 6: the magnetized surface of the sample to be tested is faced up and adhered to the aluminum base flatly by the double-sided adhesive tape, then the circular iron block (or the mutually attracted sample) with the pull rod for testing is pulled up vertically using the spring tension meter, and the maximum pulling force (F) is recorded.

The attraction force of the magnetic rubber per 10 cm2= [the maximum pulling force (F) measured by the spring scale–the weight of the circular iron block with the pull rod and the weight of the product].

The test results of Example 1 are shown in Tables 2 and 3.

TABLE 1

| Raw material composition in Example 1 | | | | | | |
|---|---|---|---|---|---|---|
| | Raw material | | | | | |
| | Anisotropic ferrite magnetic powder | Iron ore concentrate powder | Chlorinated polyethylene | Epoxidized soybean oil | Polyethylene wax | Calcium-zinc stabilizer |
| wt % | 71.22 | 18.80 | 8.83 | 0.57 | 0.23 | 0.34 |

TABLE 2

Test results of the mutual attraction of the amphoteric magnet with the soft magnet and the self-attraction of the amphoteric magnet in Example 1

| Thickness mm | Magnetic distance mm | Mutual attraction of the amphoteric magnet (Example 1) with the soft magnet Attraction force of the circular iron plate g/cm² | Self-attraction of the amphoteric magnet (Example 1) | | |
|---|---|---|---|---|---|
| | | | Attraction force of mutually attracted staggered magnetic path of the magnetic rubber g/cm² | Attraction force of completely corresponded magnetic path of the magnetic rubber g/cm² | Fluctuation of the attraction force % |
| 0.3 | 1.0 | 15-16 | 7-8 | 15-17 | 58.9 |
| | 1.5 | 20-21 | 9-10 | 16-20 | 55.0 |
| | 2.0 | 14-15 | 6-7 | 14-16 | 62.5 |
| 0.5 | 1.0 | 20-21 | 8-9 | 20-22 | 63.6 |
| | 1.5 | 40 | 16-19 | 35-40 | 60.0 |
| | 2.0 | 28-30 | 14-14 | 26-31 | 54.8 |
| 0.6 | 1.5 | 46 | 23-25 | 44-46 | 50.0 |
| | 2.0 | 40 | 18-22 | 34-40 | 55.0 |
| 0.8 | 1.5 | 57 | 31-32 | 55-56 | 44.6 |
| | 2.0 | 50 | 27-28 | 52-54 | 48.1 |
| 1.0 | 1.5 | 62 | 32-35 | 58-60 | 46.7 |
| | 2.0 | 56 | 27-30 | 53-54 | 50.0 |

Notes:
The percentage of the fluctuation of the attraction force = (maximum value − minimum value)* 100/maximum value (similarly hereinafter)

The attraction force of the mutually attracted staggered magnetic path of the magnetic rubber refers to that: the manufactured magnetic rubber having dual properties sheet sample is cut into two pieces, the N pole of one piece of magnetic rubber completely corresponds to the S pole of the other piece of magnetic rubber and then it is rotated till the minimum value recorded.

The attraction force of the completely corresponded magnetic path of the magnetic rubber refers to that: the manufactured magnetic rubber having dual properties rubber sheet sample is cut into two pieces, the N pole of one piece of magnetic rubber completely corresponds to the S pole of the other piece of magnetic rubber, thus the attraction force between the two pieces of magnetic rubber is largest.

TABLE 3

Magnetic properties of the amphoteric magnet in Example 1

| | Index | | | | |
|---|---|---|---|---|---|
| | Br (Gs) | Hcb (Oe) | Hcj (Oe) | (BH)max (MGOe) | Magnetic permeability |
| Result | 2201 | 956 | 1335 | 0.562 | 3.0247 |

It can be known from the test results in Tables 2 and 3 that, the magnet having dual properties manufactured according to the formulation of Example 1 can attract the soft magnet. Compared with the soft magnet, the magnet having dual properties has an additional self-attraction function, and the fluctuation of the attraction force on the self-attraction surface of the magnet having dual properties is within 64% (the difference between the maximum numerical value and the minimum numerical value*100/the maximum numerical value). The magnet having dual properties has both the magnetic permeability property of a soft magnet and the magnetic property of a permanent magnet.

Example 2

Referring to FIG. 1, a magnetic object having dual properties is provided, including a high-molecular polymer using a magnetic material as filler. The magnetic object having dual properties consists of components shown in Table 4.

TABLE 4

Raw material composition in Example 2

| | Raw material | | | | | |
|---|---|---|---|---|---|---|
| | Anisotropic ferrite magnetic powder | Fe—Si—Al powder | Chlorinated polyethylene | Epoxidized soybean oil | Polyethylene wax | Calcium-zinc stabilizer |
| wt % | 71.22 | 18.80 | 8.83 | 0.57 | 0.23 | 0.34 |

Manufacturing steps are as follows:

Internal mixing: the materials are prepared in proportions according to the formulation above and then milled by an internal mixer, and the clinker is discharged after the milling temperature reached 120° C. to 150° C.;

open milling: the mixed material is milled again by an open mill;

refining and crushing: the open-milled rubber sheets are refined by the internal mixer to obtain small pellets and then crushed by a crusher;

calendering: the crushed granules are directly calendered by a calendar and processed into samples having a thickness of 0.6 mm, 0.7 mm, 0.8 mm and 1.0 mm respectively;

magnetizing: each samples are magnetized in a single-sided multipolar linear manner in a direction parallel to the calendering direction, and the magnetic distance is 1.5 mm and 2.0 mm, respectively; and testing: the attraction force, magnetic permeability and magnetic properties of the samples according to this Example in mutual attraction with the soft magnet and in self-attraction are tested.

The test results in Example 2 are shown in Tables 5 and 6.

TABLE 5

Test results of the mutual attraction of the amphoteric magnet with the soft magnet and the self-attraction of the amphoteric magnet in Example 2

| Thickness mm | Magnetic distance mm | Mutual attraction of the amphoteric magnet (Example 2) with the soft magnet Attraction force of the circular iron plate g/cm$^2$ | Self-attraction of the amphoteric magnet (Example 2) | | Fluctuation of the attraction force % |
|---|---|---|---|---|---|
| | | | Attraction force of mutually attracted staggered magnetic path of the magnetic rubber g/cm$^2$ | Attraction force of completely corresponded magnetic path of the magnetic rubber g/cm$^2$ | |
| 0.6 | 1.5 | 80-82 | 35-36 | 78-84 | 58.3 |
| | 2.0 | 62-64 | 27-28 | 58-64 | 57.8 |
| 0.7 | 1.5 | 85-87 | 37-38 | 82-87 | 57.5 |
| | 2.0 | 72-74 | 30-32 | 72-74 | 59.4 |
| 0.8 | 1.5 | 90-94 | 38-40 | 86-89 | 57.3 |
| | 2.0 | 80-82 | 33-35 | 74-78 | 57.7 |
| 1.0 | 1.5 | 110-112 | 42-44 | 100-110 | 61.8 |
| | 2.0 | 100-110 | 36-40 | 100-110 | 67.3 |

TABLE 6

Magnetic properties of the amphoteric magnet in Example 2

| | Index | | | | |
|---|---|---|---|---|---|
| | Br (Gs) | Hcb (Oe) | Hcj (Oe) | (BH)max (MGOe) | Magnetic permeability |
| Result | 2422 | 1391 | 1765 | 1.019 | 2.9201 |

It can be known from the test results in Tables 5 and 6 that, in Example 2, in addition to the same conclusions as those in Example 1, different soft magnetic components in a same proportion also greatly influences the properties of the magnet having dual properties, mainly manifested as different level of magnetic properties of the magnet having dual properties and different magnitudes of the attraction force.

Comparison Example 1

Referring to FIG. 2, a soft magnetic object is provided, including a high-molecular polymer using a magnetic material as filler. The soft magnetic object consists of components shown in Table 7.

TABLE 7

Raw material composition in Comparison Example 1

| | Raw material | | | | | |
|---|---|---|---|---|---|---|
| | Anisotropic ferrite magnetic powder | Iron ore concentrate powder | Chlorinated polyethylene | Epoxidized soybean oil | Polyethylene wax | Calcium-zinc stabilizer |
| wt % | 0 | 90.02 | 8.83 | 0.57 | 0.23 | 0.34 |

Manufacturing steps are as follows:

Internal mixing: the materials are prepared in proportions according to the formulation above and then milled by an internal mixer, and the clinker is discharged after the milling temperature reached 120° C. to 150° C.;

open milling: the mixed material is milled again by an open mill;

refining and crushing: the open-milled rubber sheets are refined by the internal mixer to obtain small pellets and then crushed by a crusher;

calendering: the crushed granules are directly calendered by a calendar and processed into samples having a thickness of 0.3 mm; and testing: the magnetic permeability is measured, and the results are shown in the following table 8.

TABLE 8

Magnetic properties of the soft magnet in Comparison Example 1

| | Index | | | | |
|---|---|---|---|---|---|
| | Br (Gs) | Hcb (Oe) | Hcj (Oe) | (BH)max (MGOe) | Magnetic permeability |
| Result | No | No | No | No | 7.2053 |

Comparison Example 2

Referring to FIG. 2, a soft magnetic object is provided, including a high-molecular polymer using a magnetic material as filler. The soft magnetic object consists of components shown in Table 9.

TABLE 9

Raw material composition in Comparison Example 2

| | Raw material | | | | | |
|---|---|---|---|---|---|---|
| | Anisotropic ferrite magnetic powder | Fe—Si—Al powder | Chlorinated polyethylene | Epoxidized soybean oil | Polyethylene wax | Calcium-zinc stabilizer |
| wt % | 0 | 90.02 | 8.83 | 0.57 | 0.23 | 0.34 |

Manufacturing steps are as follows:

Internal mixing: the materials are prepared in proportions according to the formulation above and then milled by an internal mixer, and the clinker is discharged after the milling temperature reached 120° C. to 150° C.;

open milling: the mixed material is milled again by an open mill;

refining and crushing: the open-milled rubber sheets are refined by the internal mixer to obtain small pellets and then crushed by a crusher;

calendering: the crushed granules are directly calendered by a calendar and processed into samples having a thickness of 0.3 mm; and testing: the magnetic permeability is measured, and the results are shown in the following table 10.

TABLE 10

Magnetic properties of the soft magnet in Comparison Example 2

| | Index | | | | |
|---|---|---|---|---|---|
| | Br (Gs) | Hcb (Oe) | Hcj (Oe) | (BH)max (MGOe) | Magnetic permeability |
| Result | No | No | No | No | 13.739 |

Comparison Example 3

Referring to FIG. 3, a permanent magnetic object is provided, including a high-molecular polymer using a magnetic material as filler. The permanent magnetic object consists of components shown in Table 11.

TABLE 11

Raw material composition in Comparison Example 3

| | Anisotropic ferrite magnetic powder | Fe—Si—Al powder | Chlorinated polyethylene | Epoxidized soybean oil | Polyethylene wax | Calcium-zinc stabilizer |
|---|---|---|---|---|---|---|
| wt % | 90.02 | 0 | 8.83 | 0.57 | 0.23 | 0.34 |

Manufacturing steps are as follows:

internal mixing: the materials are prepared in proportions according to the formulation above and then milled by an internal mixer, and the clinker is discharged after the milling temperature reached 120° C. to 150° C.;

open milling: the mixed material is milled again by an open mill;

refining and crushing: the open-milled rubber sheets are refined by the internal mixer to obtain small pellets and then crushed by a crusher;

calendering: the crushed granules were directly calendered by a calendar and processed into samples having a thickness of 0.3 mm, 0.4 mm, 0.5 mm, 0.6 mm, 0.7 mm, 0.8 mm and 1.0 mm respectively;

magnetizing: each sample is magnetized in a single-sided multipolar linear manner in a direction parallel to the calendering direction, and the magnetic distance is 1.5 mm and 2.0 mm, respectively; and testing: parameters measured include: in mutual attraction with the soft magnet (the suction force of a suction disc) and in self-attraction of the permanent magnet, the maximum attraction force (at matched position) and the minimum attraction force (at unmatched position) in different directions; in mutual attraction with the magnet having dual properties of Example 2, the maximum attraction force (at matched position) and the minimum attraction force (at an unmatched position) in different directions.

The test results in Comparison Example 3 are shown in Tables 12 and 13.

TABLE 12

Test results of the mutual attraction of the permanent magnet of Comparison Example 3 with the soft magnet, the self-attraction of the permanent magnets and the mutual attraction of the permanent magnet with the amphoteric magnet

| | | | Self-attraction of the permanent magnet (Comparison Example 3) | | | Mutual attraction of the permanent magnet (Comparison Example 3) with the amphoteric magnet (Example 2) | | |
|---|---|---|---|---|---|---|---|---|
| Thickness mm | Magnetic distance mm | Mutual attraction of the permanent magnet (Comparison Example 3) with the soft magnet Attraction force of the circular iron plate g/cm² | Attraction force of mutually attracted staggered magnetic path of the magnetic rubber g/cm² | Attraction force of completely corresponded magnetic path of the magnetic rubber g/cm² | Fluctuation of the attraction force % | Attraction force of mutually attracted staggered magnetic path of the magnetic rubber g/cm² | Attraction force of completely corresponded magnetic path of the magnetic rubber g/cm² | Fluctuation of the attraction force % |
| 0.3 | 1.5 | 40-42 | 4-5 | 30-32 | 87.5 | 11-12 | 20-24 | 54.2 |
| | 2. | 27-28 | 2 | 20-22 | 90.9 | 9-10 | 17-18 | 50.0 |
| 0.4 | 1.5 | 46-48 | 5-6 | 36-38 | 86.8 | 15-17 | 32-34 | 55.9 |
| | 2.0 | 36-38 | 4-5 | 26-28 | 85.7 | 12-15 | 22-26 | 53.8 |
| 0.5 | 1.5 | 68-70 | 6-8 | 54-58 | 89.7 | 20-22 | 42-44 | 54.5 |
| | 2.0 | 54-56 | 6-7 | 44-46 | 86.9 | 16-18 | 36-38 | 57.9 |
| 0.6 | 1.5 | 86-88 | 8-10 | 74-76 | 89.5 | 24-26 | 46-50 | 52.0 |
| | 2.0 | 64-66 | 8-9 | 54-55 | 85.5 | 18-20 | 38-40 | 55.0 |
| 0.7 | 1.5 | 92-94 | 12-14 | 82-85 | 85.9 | 31-33 | 64-66 | 53.0 |
| | 2.0 | 75-76 | 10-11 | 62-64 | 84.4 | 23-24 | 55-57 | 59.6 |
| 0.8 | 1.5 | 96-98 | 12-15 | 84-88 | 86.4 | 34-36 | 70-72 | 52.8 |
| | 2.0 | 80-82 | 11-12 | 72-74 | 85.1 | 26-27 | 60-62 | 58.1 |
| 1.0 | 1.5 | 104-106 | 13-15 | 88-90 | 85.6 | 39-41 | 78-80 | 51.3 |
| | 2.0 | 94-96 | 12-15 | 80-85 | 85.9 | 32-34 | 70-72 | 55.6 |

TABLE 13

Magnetic properties of the permanent magnet in Comparison Example 3

| | Index | | | | |
|---|---|---|---|---|---|
| | Br (Gs) | Hcb (Oe) | Hcj (Oe) | (BH)max (MGOe) | Magnetic permeability |
| Result | 2618 | 2064 | 2689 | 1.624 | 1 |

Conclusions:

1. With reference to the following table 14, from the results of test of the magnetic properties of the magnet having dual properties of Example 1, the magnet having dual properties of Example 2 and the permanent magnet of Comparison Example 3, it is seen that in comparison with the permanent magnet the parameters of magnetic properties of the magnet having dual properties are degraded due to the incorporation of the soft magnetic phase. However, the magnetic properties are indeed lost, the magnetic permeability of soft magnetic properties is increased.

TABLE 14

Comparison of parameters of magnetic properties of the permanent magnet and the amphoteric magnet

| | Index | | | | |
|---|---|---|---|---|---|
| | Br (Gs) | Hcb (Oe) | Hcj (Oe) | (BH)max (MGOe) | Magnetic permeability |
| Permanent magnet of Comparison Example 3: | 2618 | 2064 | 2689 | 1.624 | 1 |
| Amphoteric magnet of Example 1 | 2201 | 956 | 1335 | 0.562 | 3.0247 |
| Amphoteric magnet of Example 2 | 2422 | 1391 | 1765 | 1.019 | 2.9201 |

2. With reference to the following table 15, the magnet 2 having dual properties has unexpected effects having dual properties, specifically: compared with the self-attraction of the permanent magnets, in mutual attraction of the magnet having dual properties with the permanent magnet, the maximum value of the attraction force is decreased and the minimum value is increased by 2.3 to 5 times, that is, for the mutual attraction of the magnet having dual properties with the permanent magnet, there is no phenomenon as that in self-attraction of the permanent magnets that the attraction is not strong enough to be held on with each other and till fell off at the smallest attraction force; and, the fluctuation of the attraction force in mutual attraction of the magnet having dual properties with the permanent magnet is decreased; the fluctuation in self-attraction of the permanent magnets is 84.4% to 90.9%, while the fluctuation in mutual attraction of the magnet having dual properties with the permanent magnet is 50% to 59.6%, that is, the movement or rotation on the absorption surface is smoother.

TABLE 15

Comparison of the attraction force in self-attraction of the permanent magnets and the attraction force in mutual attraction of the amphoteric magnet with the permanent magnet

| | | Self-attraction of the permanent magnets (Comparison Example 3) | | | Mutual attraction of the amphoteric magnet (Example 2) with the permanent magnet (Comparison Example 3) | | |
|---|---|---|---|---|---|---|---|
| Thickness mm | Magnetic distance mm | Attraction force of mutually attracted staggered magnetic path of the magnetic rubber g/cm² | Attraction force of completely corresponded magnetic path of the magnetic rubber g/cm² | Fluctuation of the attraction force % | Attraction force of mutually attracted staggered magnetic path of the magnetic rubber g/cm² | Attraction force of completely corresponded magnetic path of the magnetic rubber g/cm² | Fluctuation of the attraction force % |
| 0.6 | 1.5 | 8-10 | 74-76 | 89.5 | 24-26 | 46-50 | 52.0 |
| | 2.0 | 8-9 | 54-55 | 85.5 | 18-20 | 38-40 | 55.0 |
| 0.7 | 1.5 | 12-14 | 82-85 | 85.9 | 31-33 | 64-66 | 53.0 |
| | 2.0 | 10-11 | 62-64 | 84.4 | 23-24 | 55-57 | 59.6 |
| 0.8 | 1.5 | 12-15 | 84-88 | 86.4 | 34-36 | 70-72 | 52.8 |
| | 2.0 | 11-12 | 72-74 | 85.1 | 26-27 | 60-62 | 58.1 |
| 1.0 | 1.5 | 13-15 | 88-90 | 85.6 | 39-41 | 78-80 | 51.3 |
| | 2.0 | 12-15 | 80-85 | 85.9 | 32-34 | 70-72 | 55.6 |

3. With reference to the following table 16, the magnet 2 having dual properties has unexpected effects having dual properties, specifically: compared with the self-attraction of the permanent magnets, in self-attraction of the magnets having dual properties of Example 2, the minimum value is increased by more than 2 times, thus the magnet having dual properties will not fall off due to insufficient attraction force at the minimum attraction force in self-attraction; and, the fluctuation of the attraction force on the attraction surface in self-attraction of the permanent magnets exceeds 84%, while the fluctuation of the attraction force in self-attraction of the magnets having dual properties does not exceeds 68%, so that the movement or rotation on the absorption surface is smoother; moreover, the maximum value in self-attraction of the magnets having dual properties is not less than that in self-attraction of the permanent magnets.

TABLE 16

Comparison of the attraction force in self-attraction of the permanent magnets versus the attraction force in self-attraction of the amphoteric magnets

| | | Self-attraction of the permanent magnets (Comparison Example 3) | | | Self-attraction of the amphoteric magnets (Example 2) | | |
|---|---|---|---|---|---|---|---|
| Thickness mm | Magnetic distance mm | Attraction force of mutually attracted staggered magnetic path of the magnetic rubber g/cm² | Attraction force of completely corresponded magnetic path of the magnetic rubber g/cm² | Fluctuation of the attraction force % | Attraction force of mutually attracted staggered magnetic path of the magnetic rubber g/cm² | Attraction force of completely corresponded magnetic path of the magnetic rubber g/cm² | Fluctuation of the attraction force % |
| 0.6 | 1.5 | 8-10 | 74-76 | 89.5 | 35-36 | 78-84 | 58.3 |
|  | 2.0 | 8-9 | 54-55 | 85.5 | 27-28 | 58-64 | 57.8 |
| 0.7 | 1.5 | 12-14 | 82-85 | 85.9 | 37-38 | 82-87 | 57.5 |
|  | 2.0 | 10-11 | 62-64 | 84.4 | 30-32 | 72-74 | 59.4 |
| 0.8 | 1.5 | 12-15 | 84-88 | 86.4 | 38-40 | 86-89 | 57.3 |
|  | 2.0 | 11-12 | 72-74 | 85.1 | 33-35 | 74-78 | 57.7 |
| 1.0 | 1.5 | 13-15 | 88-90 | 85.6 | 42-44 | 100-110 | 61.8 |
|  | 2.0 | 12-15 | 80-85 | 85.9 | 36-40 | 100-110 | 67.3 |

4. With reference to the following table 17, the magnet 2 having dual properties has unexpected effects having dual properties, specifically: for mutual attraction with the soft magnet, the attraction force in mutual attraction of the magnet having dual properties with the soft magnet is comparable to that in mutual attraction of the permanent magnet with the soft magnet.

TABLE 17

Comparison of the attraction force of the permanent magnet with the soft magnet and the attraction force of the amphoteric magnet with the soft magnet

| | | Attraction force of the circular iron plate g/cm² (the attraction force with the soft magnet) | |
|---|---|---|---|
| Thickness mm | Magnetic distance mm | Permanent magnet (Comparison Example 3) | Amphoteric magnet (Example 2) |
| 0.6 | 1.5 | 86-88 | 80-82 |
|  | 2.0 | 64-66 | 62-64 |
| 0.7 | 1.5 | 92-94 | 85-87 |
|  | 2.0 | 75-76 | 72-74 |
| 0.8 | 1.5 | 96-98 | 90-94 |
|  | 2.0 | 80-82 | 80-82 |
| 1.0 | 1.5 | 104-106 | 110-112 |
|  | 2.0 | 94-96 | 100-110 |

Comparison Example 4

With reference to FIG. 4, a composite material having a soft magnet in its bottom layer and a permanent magnet in its surface layer is provided. The composite material consists of the following components shown in Table 18.

TABLE 18

Raw material composition in Comparison Example 4

| | | Anisotropic ferrite magnetic powder | Fe—Si—Al powder | Chlorinated polyethylene | Epoxidized soybean oil | Polyethylene wax | Calcium-zinc stabilizer |
|---|---|---|---|---|---|---|---|
| Permanent magnet layer | wt % | 90.02 | 0 | 8.83 | 0.57 | 0.23 | 0.34 |
| Soft magnet layer | wt % | 0 | 90.02 | 8.83 | 0.57 | 0.23 | 0.34 |

Manufacturing steps are as follows:

internal mixing: the materials are prepared in proportions according to the formulation above and then milled by an internal mixer, and the clinker is discharged after the milling temperature reached 120° C. to 150° C.;

open milling: the mixed material is milled again by an open mill;

refining and crushing: the open-milled rubber sheets are refined by the internal mixer to obtain small pellets and then crushed by a crusher;

calendering: the two materials are processed into samples respectively having a thickness of 0.3 mm, 0.35 mm, 0.4 mm and 0.5 mm, and the two materials of the same thickness are bonded together with glue;

magnetizing: permanent magnetic surfaces of each sample are magnetized in a single-sided multipolar linear manner in a direction parallel to the calendering direction, and the magnetic distance is 1.5 mm and 2.0 mm respectively; and testing: test is conducted in the following cases with corresponding parameters: the double-layer samples in this comparison example in mutual attraction with the soft magnet (the suction force of the suction disc); in self-attraction of the double-layer samples in this comparison example, the maximum attraction force (at matched position) and the minimum attraction force (at an unmatched position) in different directions; in mutual attraction of the double-layer samples in this comparison example with the magnet having dual properties in Example 2, the maximum attraction force (at matched position) and the minimum attraction force (at an unmatched position); and, in mutual attraction of the double-layer samples in this comparison example with the permanent magnet in Comparison Example 3, the maximum attraction force (at matched position) and the minimum attraction force (at an unmatched position).

The results of test in Comparison Example 4 are shown in Tables 19 and 20.

TABLE 19

Results of the mutual attraction of the double-layer magnet of Comparison Example 4 with the soft magnet, the self-attraction of the double-layer magnets, the mutual attraction of the double-layer magnet with the amphoteric magnet and the mutual attraction of the double-layer magnet with the permanent magnet

| Thickness mm | Magnetic distance mm | Mutual attraction of Comparison Example 4 with the soft magnet Attraction force of the circular iron plate g/cm$^2$ | Self-attraction of the double-layer magnets (Comparison Example 4) | | | Mutual attraction of the double-layer magnet (Comparison Example 4) with the amphoteric magnet (Example 2) Attraction force of mutually attracted staggered magnetic path of the magnetic rubber g/cm$^2$ |
|---|---|---|---|---|---|---|
| | | | Attraction force of mutually attracted staggered magnetic path of the magnetic rubber g/cm$^2$ | Attraction force of completely corresponded magnetic path of the magnetic rubber g/cm$^2$ | Fluctuation of the attraction force % | |
| 0.6 | 1.5 | 96-98 | 32 | 88-90 | 64.4 | 30-32 |
| | 2.0 | 66-68 | 22-26 | 64-66 | 66.7 | 22-24 |
| 0.7 | 1.5 | 104-106 | 34-35 | 92-94 | 63.8 | 35-36 |
| | 2.0 | 74-78 | 28-31 | 70-73 | 61.6 | 28-30 |
| 0.8 | 1.5 | 110-114 | 35-37 | 98-102 | 65.7 | 37-38 |
| | 2.0 | 86-90 | 33-35 | 75-80 | 58.6 | 33-34 |
| 1.0 | 1.5 | 122-124 | 41-42 | 103-105 | 61.0 | 41-42 |
| | 2.0 | 100-110 | 37-40 | 90-94 | 60.6 | 38-40 |

TABLE 19-continued

Results of the mutual attraction of the double-layer magnet of Comparison Example 4 with the soft magnet, the self-attraction of the double-layer magnets, the mutual attraction of the double-layer magnet with the amphoteric magnet and the mutual attraction of the double-layer magnet with the permanent magnet

|  |  | Mutual attraction of the double-layer magnet (Comparison Example 4) with the amphoteric magnet | | Mutual attraction of the double-layer magnet (Comparison Example 4) with the permanent magnet (Comparison Example 3) | |
|---|---|---|---|---|---|
|  |  | (Example2) | | Attraction | |
| Thickness mm | Magnetic distance mm | Attraction force of completely corresponded magnetic path of the magnetic rubber g/cm² | Fluctuation of the attraction force % | force of mutually attracted staggered magnetic path of the magnetic rubber g/cm² | Attraction force of completely corresponded magnetic path of the magnetic rubber g/cm² | Fluctuation of the attraction force % |
| 0.6 | 1.5 | 80-84 | 64.2 | 24-26 | 50-52 | 53.8 |
|  | 2.0 | 66-68 | 67.6 | 20-22 | 38-40 | 50.0 |
| 0.7 | 1.5 | 86-88 | 60.2 | 27-29 | 60-62 | 56.5 |
|  | 2.0 | 70-76 | 63.2 | 22-24 | 48-50 | 56.0 |
| 0.8 | 1.5 | 88-90 | 58.9 | 30-32 | 65-66 | 54.5 |
|  | 2.0 | 77-80 | 58.8 | 26-28 | 54-56 | 53.6 |
| 1.0 | 1.5 | 90-92 | 55.4 | 32-34 | 68-70 | 54.3 |
|  | 2.0 | 84-87 | 56.3 | 30-32 | 70-72 | 58.3 |

TABLE 20

Magnetic properties of the double-layer magnet in Comparison Example 4

| | Index | | | | |
|---|---|---|---|---|---|
| | Br (Gs) | Hcb (Oe) | Hcj (Oe) | (BH)max (MGOe) | Magnetic permeability |
| Result | 2273 | 1147 | 1295 | 0.853 | 2.9485 |

Conclusions:

1. With reference to the following table 21, the magnet having dual properties in Example 2 has unexpected magnetic effects, specifically: the single-layer magnet having dual properties, the double-layer magnet in the Comparison Example 4 and the permanent magnet are magnetically attractable objects, all of which can absorb the soft magnet with comparable attraction forces.

TABLE 21

Comparison of the attraction force of the double-layer magnet with the soft magnet and the attraction force of the amphoteric magnet with the soft magnet

| | | Attraction force of the suction disc g/cm² (the attraction force with the soft magnet) | | |
|---|---|---|---|---|
| Thickness mm | Magnetic distance mm | Double-layer magnet (Comparison Example 4) | Amphoteric magnet (Example 2) | Permanent magnet (Comparison Example 3) |
| 0.6 | 1.5 | 96-98 | 80-82 | 86-88 |
|  | 2.0 | 66-68 | 62-64 | 64-66 |
| 0.7 | 1.5 | 104-106 | 85-87 | 92-94 |
|  | 2.0 | 74-78 | 72-74 | 75-76 |
| 0.8 | 1.5 | 110-114 | 90-94 | 96-98 |
|  | 2.0 | 86-90 | 80-82 | 80-82 |

TABLE 21-continued

Comparison of the attraction force of the double-layer magnet with the soft magnet and the attraction force of the amphoteric magnet with the soft magnet

| | | Attraction force of the suction disc g/cm² (the attraction force with the soft magnet) | | |
|---|---|---|---|---|
| Thickness mm | Magnetic distance mm | Double-layer magnet (Comparison Example 4) | Amphoteric magnet (Example 2) | Permanent magnet (Comparison Example 3) |
| 1.0 | 1.5 | 122-124 | 110-112 | 104-106 |
|  | 2.0 | 100-110 | 100-110 | 94-96 |

2. With reference to the following table 22, the magnet having dual properties has unexpected effects, specifically: self-attraction can be realized with the magnet having dual properties, the permanent magnets and the double-layer magnets; the double-layer magnet in the Comparison Example 4 also has the function having dual properties of the single-layer magnet having dual properties, but the effect of dual properties Comparison Example 4 is not as good as that of Example 2, and the fluctuation of the attraction force in self-attraction of the magnets having dual properties in Example 2 is smaller. Therefore, it can be known that the single-layer magnet having dual properties in Example 2 has better self-attraction effect than the double-layer magnet, so that the movement or rotation on the surface of the single-layer magnet having dual properties in self-attraction is smoother.

TABLE 22

Comparison of the attraction force in self-attraction of the double-layer magnets, the amphoteric magnets and the permanent magnets

| | | Self-attraction of the double-layer magnets (Comparison Example 4) | | | Self-attraction of the amphoteric magnets (Example 2) | | | Self-attraction of the permanent magnets (Comparison Example 3) | | |
|---|---|---|---|---|---|---|---|---|---|---|
| Thickness | Magnetic distance | Attraction force of mutually attracted staggered magnetic path of the magnetic rubber $g/cm^2$ | Attraction force of completely corresponded magnetic path of the magnetic rubber $g/cm^2$ | Percentage of the fluctuation of the attraction force | Attraction force of mutually attracted staggered magnetic path of the magnetic rubber $g/cm^2$ | Attraction force of completely corresponded magnetic path of the magnetic rubber $g/cm^2$ | Percentage of the fluctuation of the attraction force | Attraction force of mutually attracted staggered magnetic path of the magnetic rubber $g/cm^2$ | Attraction force of completely corresponded magnetic path of the magnetic rubber $g/cm^2$ | Fluctuation of the attracttion force % |
| 0.6 | 1.5 | 32 | 88-90 | 64.4 | 35-36 | 78-84 | 58.3 | 8-10 | 74-76 | 89.5 |
|  | 2.0 | 22-26 | 64-66 | 66.7 | 27-28 | 58-64 | 57.8 | 8-9 | 54-55 | 85.5 |
| 0.7 | 1.5 | 34-35 | 92-94 | 63.8 | 37-38 | 82-87 | 57.5 | 12-14 | 82-85 | 85.9 |
|  | 2.0 | 28-31 | 70-73 | 61.6 | 30-32 | 72-74 | 59.4 | 10-11 | 62-64 | 84.4 |
| 0.8 | 1.5 | 35-37 | 98-102 | 65.7 | 38-40 | 86-89 | 57.3 | 12-15 | 84-88 | 86.4 |
|  | 2.0 | 33-35 | 75-80 | 58.6 | 33-35 | 74-78 | 57.7 | 11-12 | 72-74 | 85.1 |
| 1.0 | 1.5 | 41-42 | 103-105 | 61.0 | 42-44 | 100-110 | 61.8 | 13-15 | 88-90 | 85.6 |
|  | 2.0 | 37-40 | 90-94 | 60.6 | 36-40 | 100-110 | 67.3 | 12-15 | 80-85 | 85.9 |

3. With reference to the following table 23, the magnet having dual properties has unexpected technical effects: the magnet having dual properties of a single-layer structure in Example 2 achieves the attraction effect of the double-layer magnet in the Comparison Example 4 and can also adsorb the permanent magnet, with a small fluctuation of the attraction force.

TABLE 23

Comparison of the attraction force in mutual attraction of the double-layer magnet with the permanent magnet and in mutual attraction of the amphoteric magnet with the permanent magnet

| | | Mutual attraction of the double-layer magnet (Comparison Example 4) with the permanent magnet (Comparison Example 3) | | | Mutual attraction of the amphoteric magnet (Example 2) with the permanent magnet (Comparison Example 3) | | |
|---|---|---|---|---|---|---|---|
| Thickness mm | Magnetic distance | Attraction force of mutually attracted staggered magnetic path of the magnetic rubber $g/cm^2$ | Attraction force of completely corresponded magnetic path of the magnetic rubber $g/cm^2$ | Fluctuation of the attraction force % | Attraction force of mutually attracted staggered magnetic path of the magnetic rubber $g/cm^2$ | Attraction force of completely corresponded magnetic path of the magnetic rubber $g/cm^2$ | Fluctuation of the attraction force % |
| 0.6 | 1.5 | 24-26 | 50-52 | 53.8 | 24-26 | 46-50 | 52.0 |
|  | 2.0 | 20-22 | 38-40 | 50.0 | 18-20 | 38-40 | 55.0 |
| 0.7 | 1.5 | 27-29 | 60-62 | 56.5 | 31-33 | 64-66 | 53.0 |
|  | 2.0 | 22-24 | 48-50 | 56.0 | 23-24 | 55-57 | 59.6 |
| 0.8 | 1.5 | 30-32 | 65-66 | 50.0 | 34-36 | 70-72 | 52.8 |
|  | 2.0 | 26-28 | 54-56 | 53.6 | 26-27 | 60-62 | 58.1 |
| 1.0 | 1.5 | 32-34 | 68-70 | 54.3 | 39-41 | 78-80 | 51.3 |
|  | 2.0 | 30-32 | 70-72 | 58.3 | 32-34 | 70-72 | 55.6 |

The results of the examples and the comparison examples are concluded as follows:

Firstly, it can be known from Table 24 that the parameters of magnetic properties of the magnet having dual properties obtained by mixing a permanent magnet phase and a soft magnet phase without microscopic intergranular exchange coupling interaction is poorer than the parameters of magnetic properties of the permanent magnet, and thus the magnetic properties are lost to some extent; however, the magnet having dual properties can achieve unexpected effects having dual properties, and has both the features of a permanent magnet and the features of a soft magnet.

TABLE 24

Comparison of magnetic properties of the amphoteric magnet, the permanent magnet and the soft magnet

| Example | Main components | Br (Gs) | Hcb (Oe) | Hcj (Oe) | Bhmax (MGOe) | Magnetic permeability |
|---|---|---|---|---|---|---|
| Amphoteric magnet in Example 1 | Mixture of anisotropic ferrite magnetic powder + iron ore concentrate powder | 2201 | 956 | 1335 | 0.562 | 3.0247 |
| Amphoteric magnet in Example 2 | Mixture of anisotropic ferrite magnetic powder + Fe—Si—Al powder | 2422 | 1391 | 1765 | 1.019 | 2.9201 |
| Comparison Example 1 | Antirust iron rubber | No | No | No | No | 7.2053 |
| Comparison Example 2 | Fe—Si—Al soft magnetic rubber | No | No | No | No | 13.739 |
| Comparison Example 3 | Anisotropic magnetic rubber | 2618 | 2064 | 2689 | 1.624 | 1 |
| Comparison Example 4 | Anisotropic magnetic rubber + iron ore concentrate rubber sheet (laminated) | 2273 | 1147 | 1295 | 0.853 | 2.9485 |

Secondly, it can be known from Table 25 that: the range of a magnetically attracted object is expanded to include the magnet having dual properties of the present invention in addition to the original permanent magnet and soft magnet; the range of a magnetically attractive object is expanded to include a magnet having dual properties in addition to a permanent magnet; the magnet having dual properties has an additional self-attraction function in comparison with the soft magnet; compared with the self-attraction effect of the permanent magnet, the self-attraction effect of the magnet having dual properties and the mutual attraction effect of the magnet having dual properties with the permanent magnet are increased in the minimum value, so that the weak attraction and easy falling-off of the permanent magnet in self-attraction at the minimum value of the magnetic attraction force is avoided; since the fluctuation of the attraction force is relatively small, the movement and rotation on the force accepting surface are smoother; and, the single-layer magnet having dual properties achieves the effect exerted by a double-layer magnetic structure having a soft magnet in its bottom layer and a permanent magnet on its bonded surface layer, so that the movement or rotation in self-attraction is smoother.

TABLE 25

Comparison of the attraction force between various magnets in the examples and the comparison examples

| | Soft magnet | Permanent magnet | Amphoteric magnet | Double-layer magnet (bottom soft magnet and surface permanent magnet) |
|---|---|---|---|---|
| Soft magnet | self-attraction not available | mutual attraction available, with uniform attraction force | mutual attraction available, with uniform attraction force | mutual attraction available, with uniform attraction force |
| Permanent magnet | mutual attraction available, with uniform attraction force | Self-attraction available, but the minimum value being low, falling-off at a low value; the fluctuation of the attraction force being large | mutual attraction available, the minimum value being increased, no falling-off at a low value with insufficient attraction force, the fluctuation not exceeding 60% | mutual attraction available, the effect being comparable to that of the amphoteric magnet, and the fluctuation not large |
| Amphoteric magnet | mutual attraction available, with uniform attraction force | mutual attraction available, the minimum value being increased, no falling-off at a low value with insufficient attraction force, the fluctuation of the attraction force being small | Self-attraction available, the minimum value being increased, the maximum value being not decreased, no falling-off at a low value with insufficient attraction force, the fluctuation being not larger than that in self-attraction of the permanent magnets | mutual attraction available, the minimum value being increased, the maximum value being not decreased, no falling-off at a low value with insufficient attraction force, the fluctuation of the attraction force being not large |

TABLE 25-continued

Comparison of the attraction force between various magnets in the examples and the comparison examples

| | Soft magnet | Permanent magnet | Amphoteric magnet | Double-layer magnet (bottom soft magnet and surface permanent magnet) |
|---|---|---|---|---|
| Bottom soft magnet and surface permanent magnet | mutual attraction available, with uniform attraction force, but a double-layer structure being required | mutual attraction available, the minimum value being increased, no falling-off at a low value with insufficient attraction force, the attraction force being more uniform, but a double-layer structure being required | mutual attraction available, the minimum value being increased, no falling-off at a low value with insufficient attraction force, the fluctuation of the attraction force not exceeding 68%, but a double-layer structure being required | Self-attraction available, the minimum value being increased, no falling-off at a low value with insufficient attraction force, the fluctuation of the attraction force not exceeding 67%. |

In conclusion, in the technical solutions disclosed by the present invention, a magnet having dual properties is manufactured by mixing two phases without microscopic intergranular exchange coupling interaction. Although the overall magnetic properties are sacrificed to a certain extent, unexpected magnetic expansion effects are achieved: the range of a magnetically attracted object is expanded to include a magnet having dual properties in addition to a permanent magnet and a soft magnet; the range of a magnetically attractive object is expanded to include a magnet having dual properties in addition to a permanent magnet; and, the minimum value of the magnetic attraction force is increased, overcoming the defect with the permanent magnet that the adsorption is not firm since the attraction force is too small at the minimum value in self-attraction. Compared with the self-attraction of the permanent magnets, the fluctuation of the magnetic attraction force of the magnets having dual properties in self-attraction is decreased, the magnetic attraction force is more uniform, and it is smoother to move and rotate an object between the magnets having dual properties. The effect obtained by double-layer matching of the soft magnet and the permanent magnet can be realized by a single-layer structure of the magnet having dual properties, and the appearance of the magnet having dual properties has opened up a new field for magnetic products.

What is claimed is:

1. A magnetic material having dual properties, which consists of the following raw materials by mass percentage: 5% to 88% of a permanent magnetic material, 5% to 88% of a soft magnetic material, 6% to 16% of a binder, and 1% to 10% of an auxiliary agent;
   wherein the permanent magnetic material is anisotropic ferrite magnetic powder;
   wherein the soft magnetic material is selected from at least one of an iron ore concentrate powder and a Fe—Si—Al powder;
   wherein both the permanent magnetic material and the soft magnetic material are sheet-shaped; and
   wherein the particle size of the soft magnetic material is not greater than 100 meshes.

2. The magnetic material having dual properties according to claim 1, wherein the binder is selected from at least one of thermoplastics, thermosetting plastics, rubber, resin for coating and emulsion for coating.

3. The magnetic material having dual properties according to claim 2, wherein the binder is selected from at least one of CPE, NBR, HNBR, PVC, PE, PP, POE, EVA, EAA, EEA, TPU, SEBS, SBS, IR, IIR, CR, and EPDM.

4. The magnetic material having dual properties according to claim 1, wherein the auxiliary agent is selected from at least one of an antioxidant, a stabilizer, a lubricant, a coupling agent, an ultraviolet absorber, a dispersing agent, an antifoaming agent and a thickening agent.

5. A method for manufacturing the magnetic material having dual properties of claim 1, wherein uniformly mixing, molding, orientating and then magnetizing a permanent magnetic material, a soft magnetic material, a binder and an auxiliary agent to obtain the magnetic material having dual properties, wherein molding and orienting occur simultaneously.

6. The method for manufacturing the magnetic material having dual properties according to claim 5, wherein the molding method is selected from one of calendering, tape casting, injection molding, and extrusion molding.

* * * * *